US010290380B2

(12) United States Patent
Morrison

(10) Patent No.: US 10,290,380 B2
(45) Date of Patent: May 14, 2019

(54) APPARATUS FOR INSPECTING NUCLEAR REACTOR AND METHOD THEREOF

(71) Applicant: GE—Hitachi Nuclear Energy Americas LLC, Wilmington, NC (US)

(72) Inventor: William Aaron Morrison, Wilmington, NC (US)

(73) Assignee: GE—HITACHI NUCLEAR ENERGY AMERICAS LLC, Wilmington, NC (US)

( * ) Notice: Subject to any disclaimer, the term of this patent is extended or adjusted under 35 U.S.C. 154(b) by 529 days.

(21) Appl. No.: 14/982,130

(22) Filed: Dec. 29, 2015

(65) Prior Publication Data

US 2017/0186504 A1    Jun. 29, 2017

(51) Int. Cl.
| G21C 17/00 | (2006.01) |
| G21C 17/007 | (2006.01) |
| B62D 57/032 | (2006.01) |
| G21C 17/01 | (2006.01) |
| G21C 17/013 | (2006.01) |
| G21C 19/20 | (2006.01) |

(52) U.S. Cl.
CPC ......... *G21C 17/007* (2013.01); *B62D 57/032* (2013.01); *G21C 17/01* (2013.01); *G21C 17/013* (2013.01); *G21C 19/207* (2013.01)

(58) Field of Classification Search
CPC .... G21C 17/00; G21C 17/003; G21C 17/007; G21C 17/01; G21C 17/013
See application file for complete search history.

(56) References Cited

U.S. PATENT DOCUMENTS

| 4,345,658 A * | 8/1982 | Danel ................. G21C 17/013 180/164 |
| 5,586,155 A | 12/1996 | Erbes et al. |
| 6,422,508 B1 | 7/2002 | Barnes |
| 2007/0253518 A1 | 11/2007 | Shimamura et al. |
| 2008/0317192 A1 | 12/2008 | Rowell et al. |
| 2010/0232562 A1 | 9/2010 | Shimamura et al. |
| 2010/0296617 A1 | 11/2010 | Rowell et al. |
| 2012/0140865 A1* | 6/2012 | Vigliano .............. G21C 17/003 376/249 |
| 2013/0243144 A1 | 9/2013 | Villagomez |

(Continued)

FOREIGN PATENT DOCUMENTS

| DE | 100 00 096 A1 | 7/2001 |
| DE | 102 19 740 A1 | 11/2003 |

OTHER PUBLICATIONS

"Top scholar technology 2013: Robotic window cleaner," Retreived from the Internet URL: http://technology.tki.org.nz/Resources/Student-showcases/Construction-and-mechanical-technologies/Robotic-window-cleaner, on May 10, 2017, pp. 1-3 (2013).

(Continued)

*Primary Examiner* — Marshall P O'Connor
(74) *Attorney, Agent, or Firm* — Harness, Dickey & Pierce, P.L.C.

(57) ABSTRACT

Example embodiments disclose an apparatus for inspecting welds in a nuclear reactor. The apparatus may include a body, a rotatable pad on the body, a pair of opposing horizontal pads for moving the device in a vertical direction, a pair of opposing vertical pads for moving the device in a horizontal direction, and an inspection device.

18 Claims, 7 Drawing Sheets

(56) References Cited

U.S. PATENT DOCUMENTS

2014/0211902 A1* 7/2014 Park ................... G21C 17/017
376/249
2015/0200026 A1 7/2015 Kuntz et al.

OTHER PUBLICATIONS

Extended European Search Report and Opinion issued in connection with corresponding EP Application No. 16203390.6 dated May 19, 2017.

* cited by examiner

APPARATUS FOR INSPECTING NUCLEAR REACTOR AND METHOD THEREOF

BACKGROUND

Field

Example embodiments relate to an apparatus for inspecting welds of a nuclear reactor and methods of using the same.

Description of Related Art

FIG. 1A illustrates a general arrangement of a core shroud 2 inside a reactor pressure vessel (RPV) 4. Feedwater is admitted into the RPV 4 via a feedwater inlet (not shown) and a feedwater sparger 6, which is a ring-shaped pipe having suitable apertures for circumferentially distributing the feedwater inside the RPV. The feedwater from the sparger 6 flows downwardly through the downcomer annulus 8, which is an annular region between the core shroud 2 and the RPV 4.

The core shroud 2 is a stainless steel cylinder surrounding the nuclear fuel core, the location of which is generally designated by numeral 10 in FIG. 1A. The core is made up of a plurality of fuel bundle assemblies. Each array of fuel bundle assemblies is supported at the top by a top guide and at the bottom by a core plate (neither of which are shown). The core top guide provides lateral support for the top of the fuel assemblies and maintains the correct fuel channel spacing to permit control rod insertion.

The water flows through downcomer annulus 8, around the bottom edge of the shroud and into the core lower plenum 12. The water subsequently enters the fuel assemblies, wherein a boiling boundary layer is established. A mixture of water and steam enters core upper plenum 14 under the shroud head 16. The steam-water mixture then flows through vertical standpipes (not shown) atop the shroud head and enters steam separators (not shown), which separated liquid water from steam. The liquid water then mixes with feedwater in the mixing plenum, which mixture then returns to the core via the downcomer annulus. The steam is withdrawn from the RPV via a steam outlet.

The boiling water reactor (BWR) also includes a coolant recirculation system which provides a forced convection flow through the core necessary to attain the required power density. A portion of the water is sucked from the lower end of the downcomer annulus 8 via recirculation water outlet (not visible in FIG. 1A) and forced by a centrifugal recirculation pump (not shown) into jet pump assemblies 18 (two of which are shown in FIG. 1A)) via recirculation water inlets 20. The BWR has two recirculation pumps, each of which provides the driving flow for a plurality of jet pump assemblies. The jet pump assemblies are circumferentially distributed around the core shroud 2.

As shown in FIG. 1B, the core shroud 2 includes a shroud head flange 2a for supporting the shroud head 16, a circular cylindrical upper shroud wall 2b having a top end welded to shroud head flange 2a, an annular top guide support ring 2c welded to the bottom end of upper shroud wall 2b, a circular cylindrical middle shroud wall having a top end welded to top guide support ring 2c and consisting of upper and lower shell sections 2d and 2e joined by mid-shroud attachment weld W, and an annular core plate support ring 2f welded to the bottom end of the middle shroud wall and to the top end of a lower shroud wall 2g. The entire shroud is supported by a shroud support 22, which is welded to the bottom end of lower shroud wall 2g, and by annular jet pump support plate 24, which is welded at its inner diameter to shroud support 22 and at its outer diameter to RPV 4.

The material of the shroud and associated welds is austenitic stainless steel having reduced carbon content. The heat-affected zones of the shroud girth welds, including the mid-shroud attachment weld, have residual weld stresses. Therefore, the mechanisms are present for mid-shroud attachment weld W and other girth welds to be susceptible to intergranular stress corrosion cracking (IGSCC).

Stress corrosion cracking in the heat affected zone of any shroud girth seam weld diminishes the structural integrity of the shroud, which vertically and horizontally supports the core top guide and the shroud head. In particular, a cracked shroud increases the risks posed by a loss-of-coolant accident (LOCA) or seismic loads. During a LOCA, the loss of coolant from the reactor pressure vessel produces a loss of pressure above the shroud head and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant. Also, if the shroud weld zones fail due to stress corrosion cracking, there is a risk of misalignment from seismic loads and damage to the core and the control rod components, which would adversely affect control rod insertion and safe shutdown.

Thus, the core shroud needs to be examined periodically to determine its structural integrity and the need for repair. Ultrasonic inspection is a known technique for detecting cracks in nuclear reactor components. The inspection area of primary interest is the outside surface of the cylindrical core shroud at the horizontal mid-shroud attachment welds. However, the core shroud is difficult to access. Installation access is limited to the annular space between the outside of the shroud and the inside of the reactor pressure vessel, between adjacent jet pumps. Scanning operation access is additionally restricted within the narrow space between the shroud and jet pumps, which is about 0.5 inch wide in some locations. The inspection areas are highly radioactive, and may be located under water 50 to 65 feet below the operator's work platform. Thus, inspection of the core shroud in operational nuclear reactors requires a robotic scanning device which can be installed remotely and operated within a narrowly restricted space.

However, robotic scanning devices (e.g., remotely operative vehicle (ROV)) scanners use rollers to travel around outer diameter of the shroud, which has difficulties in staying level during horizontal weld scanning and/or staying on the weld to be scanned. In addition, ROV scanners require large amount of buoyance chambers to remain neutrally buoyant and constant in the horizontal level.

In other related art, ROV scanners may use tether to pull the tool upward. However, this creates problems in that an operator must move the entire tool to advance the scanning probe. In addition, these type of ROV scanners are very large and heavy, not flexible and maneuverable, and more difficult and complicated to install and operate.

BRIEF DESCRIPTION OF EXAMPLE EMBODIMENTS

Example embodiments disclose an apparatus for inspecting welds in a nuclear reactor. The apparatus may include a body, a rotatable pad on the body, a pair of opposing horizontal pads for moving the device in a vertical direction, a pair of opposing vertical pads for moving the device in a horizontal direction, and an inspection device.

In a further example embodiment, the rotatable pad may be located at a central portion of the body to rotate the device.

In yet a further example embodiment, the rotation of the apparatus may be in increments of 90 degrees.

In a further example embodiment, a leg may be attached to each side of the body.

In yet a further example embodiment, the leg may be attached to the body with a stem member.

In yet a further example embodiment, the leg may be substantially Y-shaped or U-shaped.

In a further example embodiment, the apparatus may include a forked arm.

In yet a further example embodiment, each pad may be mounted on the forked arm.

In yet a further example embodiment, the forked arm may be substantially Y-shaped or U-shaped.

In a further example embodiment, a support member may be attached to the forked arm. The support member may include a hole for inserting a shaft and moving the pads in a respective horizontal or vertical direction.

In a further example embodiment, the pair of opposing horizontal and vertical pads may slide in a respective axial direction of the shaft.

In yet a further example embodiment, the shaft may be a ball screw that translates rotational motion to linear motion.

In a further example embodiment, the inspection device may be mounted on the leg.

In yet a further example embodiment, the inspection device may be an ultrasonic probe.

In yet a further example embodiment, the ultrasonic probe may be attached to a gimbal sensor.

In a further example embodiment, the inspection device may be supported by support arms.

In a further example embodiment, a vacuum system may controllably adhere or force the pads to the surface of a core shroud.

Example embodiments disclose a method for inspecting welds in a core shroud of a nuclear reactor. The method may include moving an inspection device to along a wall of a core shroud, attaching a pair of opposing horizontal pads to move in a vertical direction, releasing the pair of opposing horizontal pads, attaching a pair of opposing vertical pads to move in a horizontal direction, releasing the pair of opposing vertical pads, attaching a central pad to a surface of the core shroud, and rotating the central pad.

In a further example embodiment, the method may include attaching an inspection tool to the device.

In a further example embodiment, the inspection tool may be moved to align the inspection tool toward the weld to be measured and inspected.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1A:
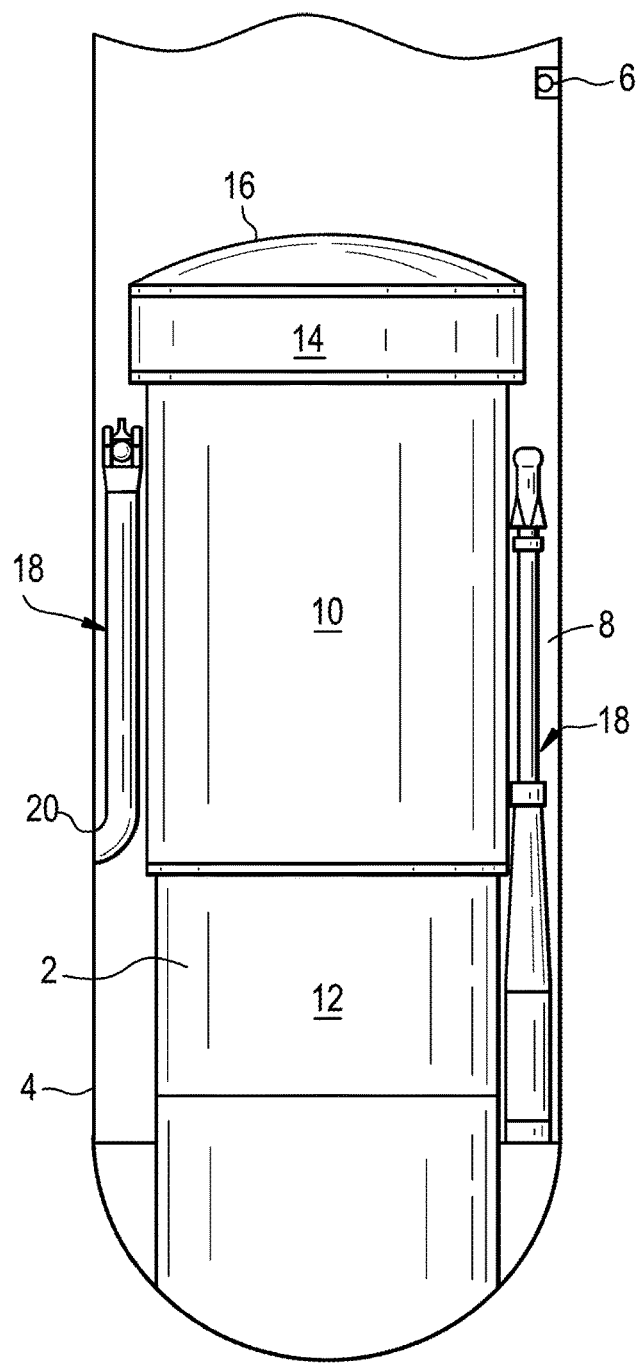
FIG. 1A is a schematic view of an elevation view of pertinent portions of a conventional nuclear reactor.
Figure 1B:
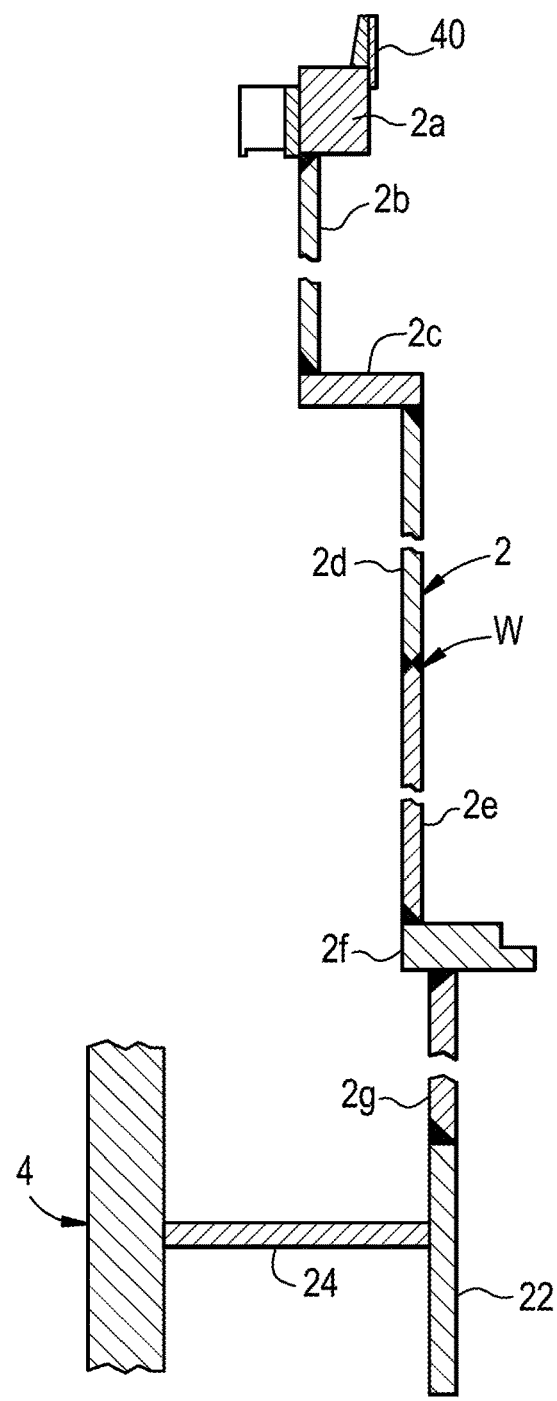
FIG. 1B is a sectional view of a portion of a core shroud of a conventional nuclear reactor depicted in FIG. 1A.

Detailed descriptions of the illustrative embodiments are disclosed herein. Specific structural and functional details are also disclosed herein, however, are merely representative for purposes of describing the example embodiments. For example, although the example embodiments may be described with reference to a nuclear power plant, it is understood that the example embodiments may also be useable in other types of industrial facilities. These facilities may have a need for the elimination of hard-wired, point-to-point connections for field equipment but need a robust digital system with safety functions. The example embodiments may be exemplified in many alternate forms and should not be construed as being limited to the specified example embodiments set forth herein.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the ter iris "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least one example embodiment discloses an apparatus for inspecting welds in a nuclear reactor. The apparatus may include a body, a rotatable pad on the body, a pair of opposing horizontal pads for moving the device in a vertical direction, a pair of opposing vertical pads for moving the device in a horizontal direction, and an inspection device.

At least one example embodiment discloses a method for inspecting welds in a core shroud of a nuclear reactor. The method may include attaching a center pad to a wall of the core shroud, rotating a device, moving the device in a horizontal direction via a pair of opposing vertical pads to inspect a horizontal weld, moving the device in a vertical direction via a pair of opposing horizontal pads to inspect a vertical weld, and attaching the pair of opposing horizontal and vertical pads to the wall of the core shroud.

The exemplary embodiments are described herein in the context of a core shroud of a boiling water reactor (BWR). However, it will be apparent to one skilled in the art that the exemplary embodiments are applicable in other contexts including to other underwater structures. The example embodiments described herein are configured with respect to an outer surface or outer diameter of a structure although the teachings herein can be applied to an inner surface or inner diameter of a structure.

Figure 2:
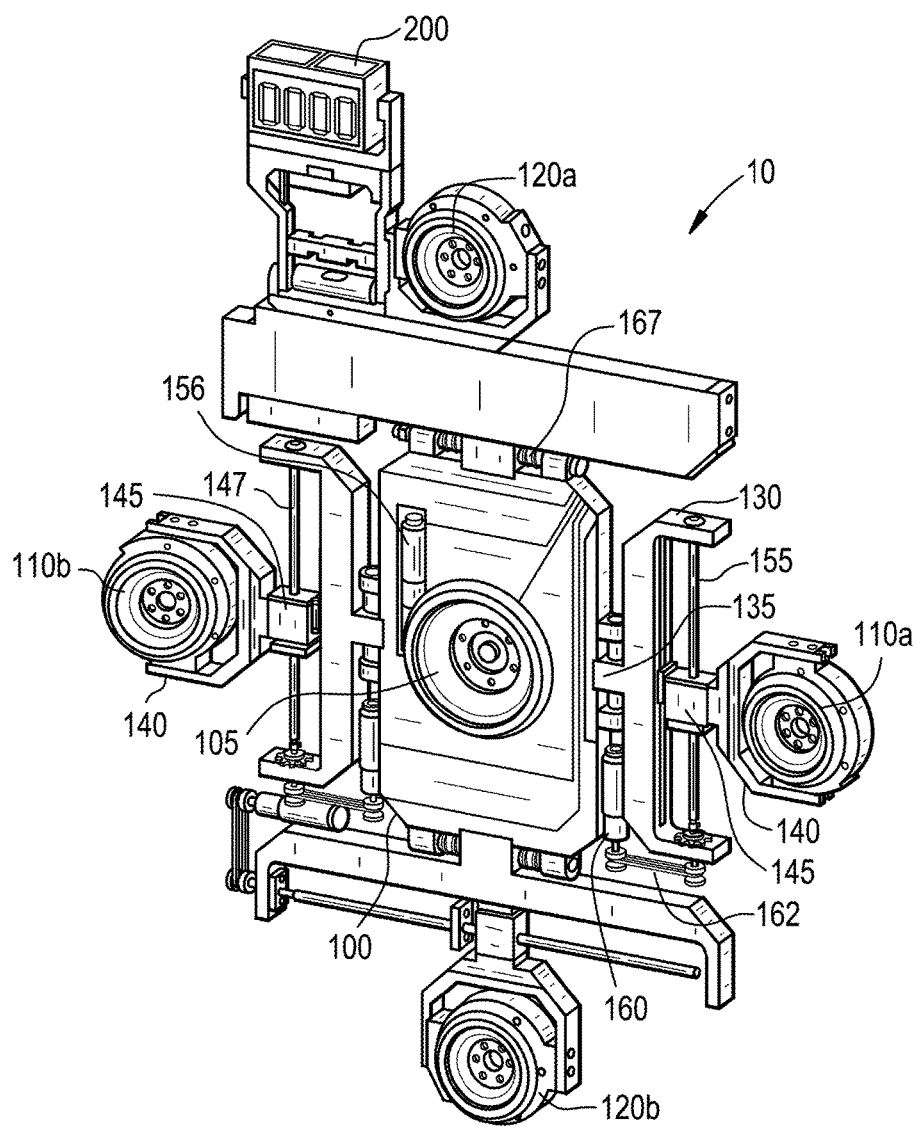
FIG. 2 is a perspective view of an apparatus for inspecting welds for a nuclear reactor, according to an example embodiment.
Figure 3:
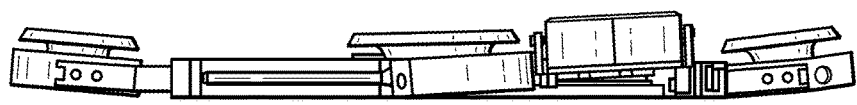
FIG. 3 is schematic view with a side cross-sectional view of an apparatus for inspecting welds for a nuclear reactor, according to an example embodiment.
Figure 4A:
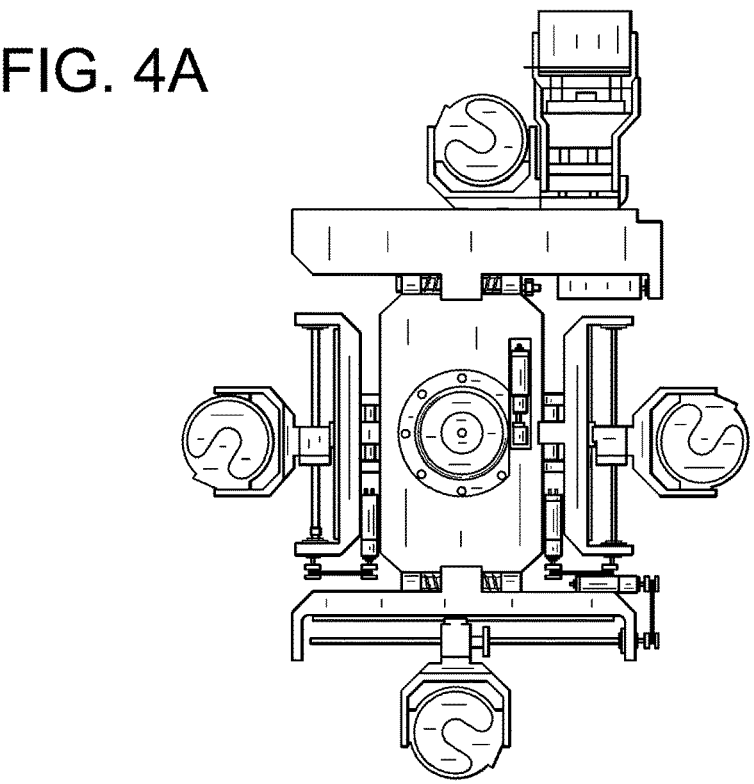
FIG. 4A is a schematic view with a back view of an apparatus for inspecting welds for a nuclear reactor, according to an example embodiment.
Figure 4B:
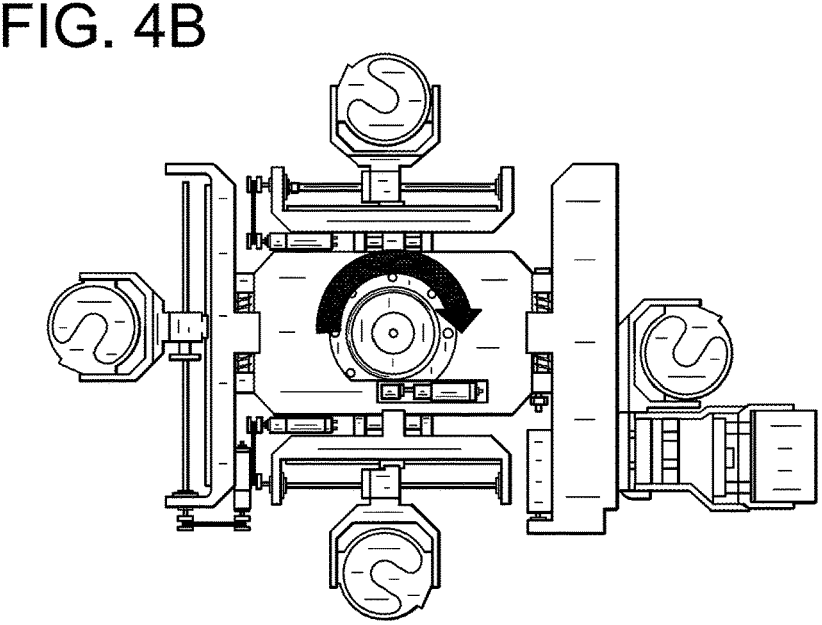
FIG. 4B is a schematic view with a back view of an apparatus for inspecting welds for a nuclear reactor rotated 90 degrees in comparison to FIG. 4A, according to an example embodiment.

FIG. 2 is a perspective view of an apparatus for inspecting welds for nuclear reactor, according to an example embodiment. More specifically, an inspecting apparatus 10 may be configured to conform to a profile of an outer surface of a core shroud 2 (as shown in FIG. 1A), attach to the outer surface of the core shroud 2, navigate along the outer surface of the core shroud 2, and inspect welds of the core shroud 2.

Referring to FIG. 2, the inspecting apparatus 10 may include a body 100, a rotatable suction pad 105, a pair of opposing horizontal suction pads 110a, 110b, a pair of opposing vertical suction pads 120a, 120b, and an inspection tool 200. The body 100 may be substantially rectangular in shape. The body 100 may be approximately one inch in thickness. It should be appreciated that other dimensions of the body may be utilized while maintaining the function of the apparatus.

The suction pad 105 may be located at a center of the body 100 to rotate the inspection apparatus 10. The rotation may be in increments of 90 degrees having a full range of 360 degrees. The suction pad 105 may be rotated using a worm and a worm gear (not shown) built inside the body 100 of the inspection apparatus 10 to rotate the suction pad 105. It should be appreciated that other types of gear(s) may be utilized for rotating the suction pad 105.

A leg 130 may be attached to each side of the body 100. In this example embodiment, there are four legs 130. The leg 130 may include a stem 135 attached at a center of each side of the body 100. It should be appreciated that the stem 135 and the leg 130 may be built as one-piece or as two separate pieces. The leg 130 may be substantially Y-shaped or U-shaped. It should be appreciated that other shapes may be employed without departing from the function of the leg.

Each suction pads 110a, 110b, 120a, 120b may be mounted on a forked arm 140. The forked arm 140 may be substantially Y-shaped or U-shaped. It should be appreciated that other shapes may be implemented as long as the arm member supports the suction pads 110a, 110b, 120a, 120b. The forked arm 140 may be attached to a support member 145. It should be appreciated that the forked arm 140 and the support member 145 may be a single unit or two separate units. The support member 145 may include a hole 147 for inserting a shaft 155 and moving the suction pads 110a, 110b, 120a, 120b in a respective horizontal or vertical direction.

In an example embodiment, the shaft 155 may be a ball screw. One skilled in the art would appreciate that a ball screw may be a mechanical linear actuator that translates rotational motion to linear motion with little friction. Furthermore, it should be appreciated that the shaft (ball screw) 155 may be threaded so that a helical raceway for ball bearings may act as a precision screw. The ball assembly may also act as a nut while the threaded shaft is the screw. In addition, the shaft 155 (ball screw) may be able to apply or withstand high thrust loads with minimum internal friction. Moreover, the shaft (ball screw) 155 may be made to close tolerances so that high precision is achieved.

As shown in FIG. 2, the shaft (ball screw) 155 may be supported at each end of the leg 130. The movement of the shaft (ball screw) 155 may be controlled by a motor 160 connected via a belt 162. It should be appreciated that other configurations may be utilized to move the shaft (ball screw) 155.

The forked akin 140 may move the suction pads 110*a*, 110*b*, 120*a*, 120*b* in the respective horizontal or vertical direction. In an example embodiment, there are four suction pads, one on each side of the body 100. Of the four, the opposite pair suction pads 110*a*, 110*b* may be used to move the apparatus 10 in the vertical direction or along a longitudinal axis of the core shroud 2, and the opposite pair suction pads 120*a*, 120*b* may be used to move the apparatus 10 in the horizontal direction or around a circumference of the core shroud 2.

During a horizontal travel mode of operation, the opposite pair suction pads 120*a*, 120*b* may contact the surface of the core shroud 2 and the opposite pair suction pads 110*a*, 110*b* may be retracted (or released) so as not to be in contact with the surface of the core shroud 2. During a vertical travel mode of operation, the opposite pair suction pads 110*a*, 110*b* may be extended to contact the surface of the core shroud 2, and may release the opposite pair suction pads 120*a*, 120*b* so that the opposite pair suction pads 120*a*, 120*b* will not be contact with the surface of the core shroud 20. The suction pads 110*a*, 110*b*, 120*a*, 120*b* may be extended by an actuation of a pneumatic piston 156 controlled by a control unit (not shown). The suction pads 110*a*, 110*b*, 120*a*, 120*b* may further be retracted (or released) via tension springs 167. It should be appreciated that other retraction device utilizing vacuum attachment force may be used.

Figure 5:
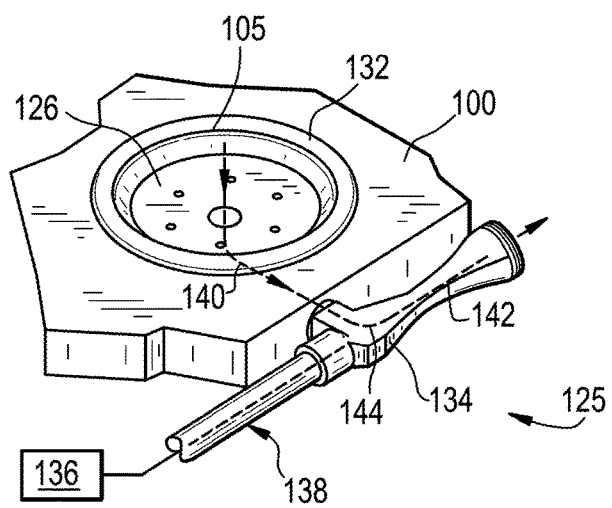
FIG. 5 is an exploded perspective view of a central suction pad, according to an example embodiment.

Referring to FIG. 5, the rotatable suction pad 105 may include elements of a vacuum system 125 that may be configured to controllably adhere or force to the surface of the core shroud 2. It should be appreciated that besides the suction pad 105, the same vacuum system may be employed in suction pads 110*a*, 110*b*, 120*a*, 120*b* as well.

The vacuum system 125 may create a low pressure or vacuum space in a void 126. The void 126 may be defined and surrounded by a sealing ring 132. The sealing ring 132 may be configured to seal against the surface of the core shroud 2 to isolate the void 126 from the annulus so that the pressure in the void 126 can be reduced or otherwise controlled to adhere the inspecting apparatus 10 to the surface of the core shroud 2. The sealing ring 132 may be configured to move over obstacles on the surface of the core shroud 2. In an example embodiment, the sealing ring 132 may have a rounded profile and may be made of a flexible material to allow the inspecting apparatus 10 to travel over surface variations such as weld crowns.

Figure 6:
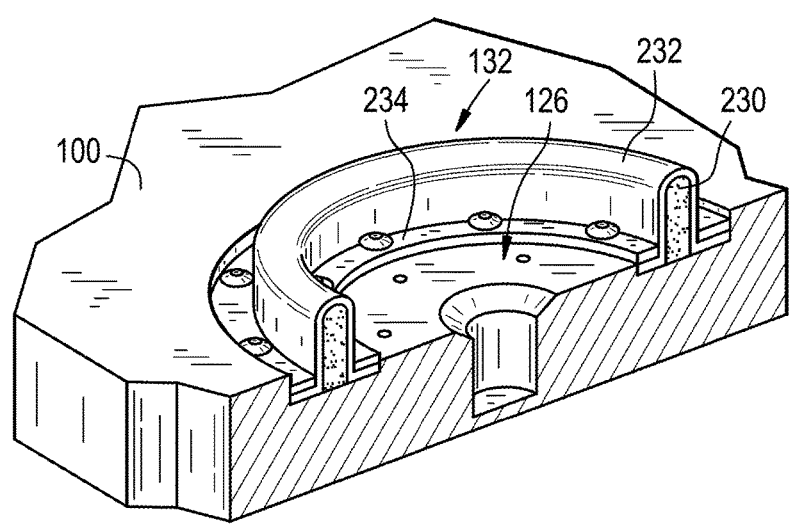
FIG. 6 is a cross-sectional view of the central suction pad of FIG. 5, according to an example embodiment.

Referring to FIG. 6, the sealing ring 132 may include a closed-cell foam ring 230 or a skirt that may be wrapped with a cover 232. It should be appreciated that the cover 232 may be made from, for example, not limited to, a neoprene-coated nylon. A ring-shaped plate 234 may be bolted to the abdomen to hold the inner and outer edges of the cover 232 to the abdomen and hold the cover 232 over the foam ring 230. The foam ring 230 may be compressed and expanded to move over obstacles while still maintaining a vacuum seal. It should further be appreciated that the foam ring 230 may move over obstacles without folding and losing suction. The cover 232 may protect the foam ring 230 such that the sealing ring 132 is durable and robust.

In other example embodiments, it is appreciated that multiple sealing rings 132 may be used, such that if one sealing ring loses suction while moving over an impediment or obstacle, the inspecting apparatus 10 remains attached to the surface.

Referring back to FIG. 5, the vacuum system 125 may include a venturi valve 134, a pump 136 or other pressurized water supply, and a hose 138 that may connect the pump 136 to the venturi valve 134. The control unit (not shown) may be configured to control the pump 136. The pump 136 may draw water from the annulus and may supply the water to the venturi valve 134. The pump 136 may be located, for example, at the top of the core shroud 2 above the water level on the refueling floor. The pump 136 may be configured to recirculate water already in the inspecting apparatus 10.

The venturi valve 134 may be configured to displace water from the void 126 as a function of water pressure supplied by the pump 136. A channel 140 may connect the void 126 to the flow path 142. The flow path 142 of the venturi valve 134 may be narrow and may then expand in the flow direction such that pressurized water supplied by the pump 136 to the venturi valve 134 creates low pressure at a low pressure location 144 in the venture valve 134. The channel 140 may be connected to the flow path 142 at the low pressure location 144. As such, pressurized water supplied by the pump 136 through the venturi valve 134 may draw water from the void 126 into the flow path 142 of the venturi valve 134 and may lower the pressure in the void 126. The venturi valve 134 may not require moving parts to lower the pressure in the void 126. Thus, the venturi valve 134 may reduce the risk of breakdown of the vacuum system 125 and may reduce the introduction of debris into the inspecting apparatus 10. The venturi valve 134 may allow for greater control of vacuum force as compared to using a pump to directly pump water from the void 126. The vacuum force provided by the venturi valve 134 may be controlled as a function of pressurized water or pump flow from pump 136.

Referring back to FIG. 2, the inspecting apparatus 10 may further include a navigation system (not shown) that is configured to move the inspecting apparatus 10 along the surface of the core shroud 2 to globally position an ultrasonic probe, as described in further detail below. When moving, the inspecting apparatus 10 may maintain its orientation with respect to the core shroud 2 such that the profile of the inspecting apparatus 10 may match the profile of the surface of the core shroud 2. The inspecting apparatus 10 may be configured to maneuver both horizontally and vertically using motor driven wheels. Furthermore, the inspecting apparatus 10 may translate and may rotate.

Figure 7:
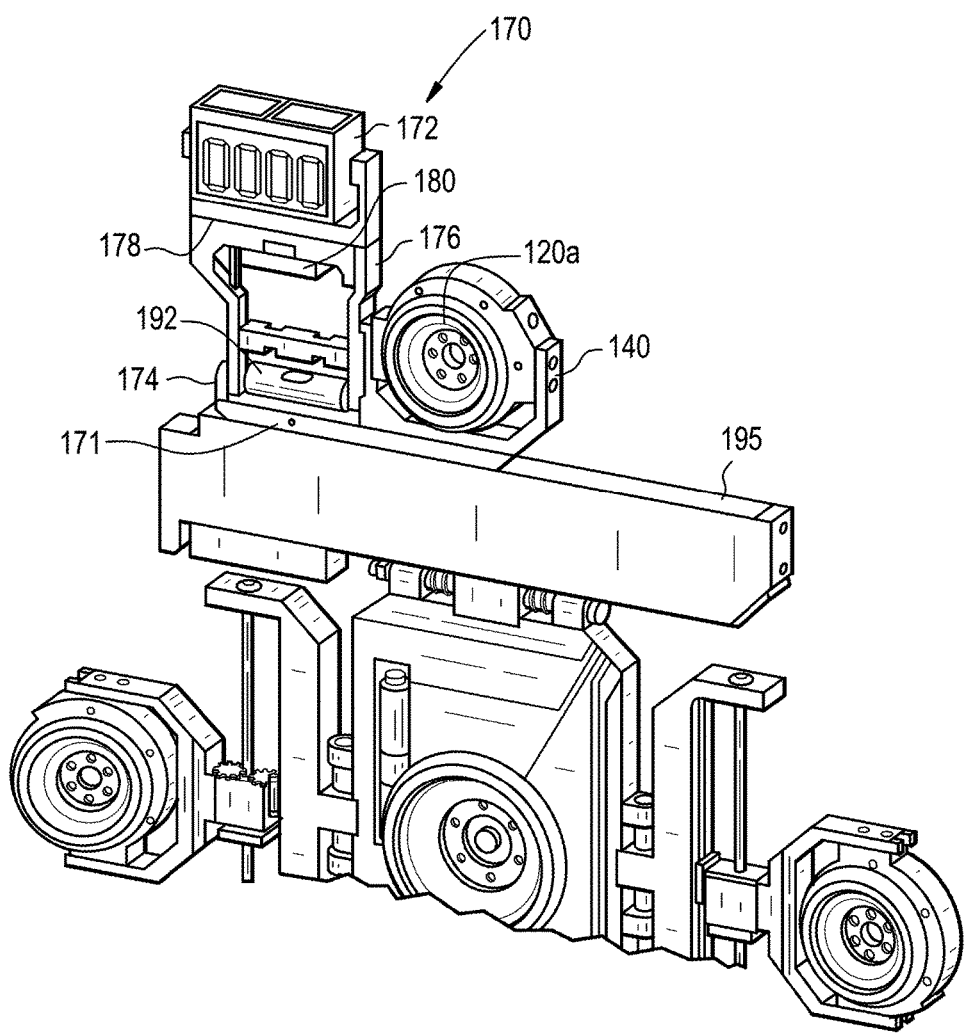
FIG. 7 is an exploded perspective view of a weld-scanning system, according to an example embodiment.

With reference to FIGS. 2 and 7, the inspecting apparatus 10 may include a weld-scanning system 170 that may be configured to inspect welds of the core shroud 2. The weld-scanning system 170 may include an ultrasonic probe 172 and a probe positioning system 174 that is configured to locally position the ultrasonic probe 172 to inspect various welds. The probe positioning system 174 may be configured to position the ultrasonic probe 172 to inspect welds of various orientations including horizontal welds, vertical welds, and welds at angles in between horizontal and vertical. The probe positioning system 174 may include a support arm 171 to support scan arms 176 and the forked arm 140 of the suction pad 120*a*. The forked arm 140 may be attached to the support member 145 for moving the suction pad 120*a* in the respective horizontal or vertical direction.

At the outer edges of the ultrasonic probe 172, scan arms 176 may support the ultrasonic probe 172. The scan arms 176 may be substantially similar and symmetrically oriented with respect to each other. The scan arm 176 may include a rail 178 extending perpendicular to the scan alms 176, and a gimbal 180 that may be attached to the rail 178 with a linear bearing (not shown), for example. As an example embodiment, the gimbal 180 may provide a scan length of approximately two feet. The linear bearing may be selected based on reliability and minimal foreign material (FM) potential. A motion driving mechanism is configured to be actuated to move the gimbal 180 along the shaft 155 (shown in FIG. 2). For example, the motion driving mechanism may include the motor 160 that drives the ball screw 155. The motor 160 may be coupled to the ball screw 155 using the belt 162 (or gear train) so as to transmit torque to the ball screw 155. The ball screw 155 may be coupled to the support member 145. The motor 160 may be offset from the ball screw 155 so as to minimally restrict movement of the gimbal 180 along the rail 178.

The ultrasonic probe 172 may be attached to the gimbal 180. An actuated motor 192 may be configured to move the gimbal 180. In order to achieve reliable, robust rotation, a worm gear is used. This allows the mechanism to maintain a low profile as well as achieve a high gear ratio so a small motor may be used. The gimbal 180 may also include a torsion spring (not shown) that may be configured to bias the ultrasonic probe 172 against the surface of the core shroud 2. A foreign material exclusion (FME) guard (not shown) may be used to cover the torsional spring. The ultrasonic probe 172 may be attached to the gimbal 180 so as to be able to rotate in a substantially flat-face contact with the surface of the core shroud 2.

The ultrasonic probe 172 may be configured to be positioned along a length of an associated rail 178 and to be angularly positioned in a one-hundred and eighty degree range to inspect the welds. The ultrasonic probe 172 may be positioned to inspect horizontal welds and vertical welds along the sides of the inspecting apparatus 10 as well as above and below the inspecting apparatus 10. The control unit (not shown) may control the actuation of the motors 184, 192 to position the ultrasonic probe 172.

In another example embodiment, a cover 195 may be used to enclose or encase the leg 130. It should be appreciated that the cover 195 may enclose all four legs 130 of the inspecting apparatus 10. The cover 195 may be employed to protect the components of the leg 130, which may include, among others, the support member 145, the shaft 155, the motor 160, and the belt 162. The cover 195 may be made from sheet metal, for example.

Figure 8:
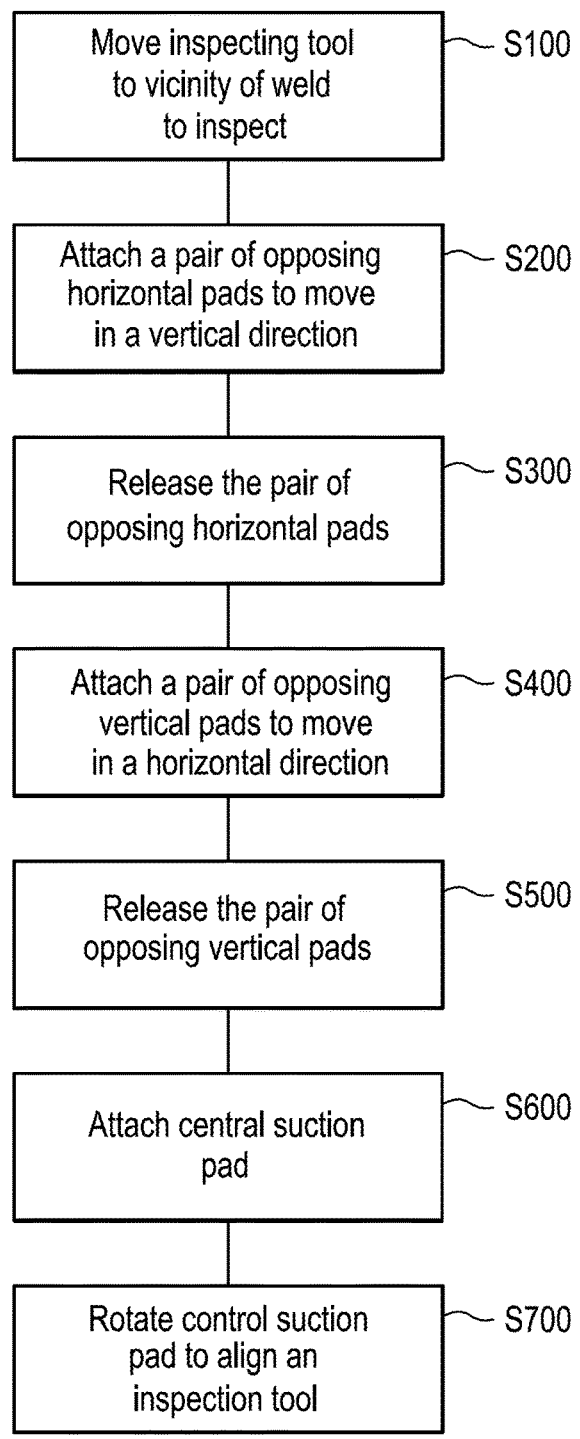
FIG. 8 is a flowchart of illustrating a method of inspecting welds in a nuclear reactor, in accordance with an example embodiment.

FIG. 8 is a flowchart of illustrating a method of inspecting welds in a nuclear reactor, in accordance to an example embodiment. Each step may be performed according to the execution of a software module of computer-executable instructions by a control unit. In step S100, the inspecting apparatus 10 may move to a position on the core shroud 2 in a vicinity of the weld to be inspected. Once the inspecting apparatus 10 is in the vicinity of the weld to be inspected, the vacuum system may activate and attach the inspecting apparatus 10 to the core shroud. In step S200, for horizontal movement, the vacuum system may operate the opposite pair suction pads 120a, 120b to contact the surface of the core shroud 2 and the opposite pair suction pads 110a, 110b may be retracted (or released) so as not to be in contact with the surface of the core shroud 2. The opposite pair suction pads 110a, 110b may then move horizontally along the core shroud 2. In step S300, once the position of the pair of opposite pair suction pads 110a, 110b is determined, release the pair of opposite pair suction pads 120a, 120b to move vertically. In step S400, for vertical movement, the vacuum system may operate the opposite pair suction pads 110a, 110b to contact the surface of the core shroud 2. In step S500, the opposite pair suction pads 120a, 120b may be released so that the opposite pair suction pads 120a, 120b may not be in contact with the surface of the core shroud 2. The opposite pair suction pads 120a, 120b may then move vertically along the core shroud 2. Thereafter, a navigation system may move the inspecting apparatus 10 along the surface of the core shroud 2 to globally position the inspecting apparatus 10. The probe positioning system 174 may locally position and orient the ultrasonic probe 172 with respect to a crack in a weld or another feature to be measured by rotating the inspecting apparatus 10. In step S600, the central suction pad 105 attaches to the surface of the core shroud 2 to rotate the inspecting apparatus 10. In step S700, the inspecting apparatus 10 may be rotated to align the ultrasonic probe 172 toward the weld to be measured and inspected.

It should be appreciated that the ultrasonic probe 172 may measure the length and width of the crack and the measurement may be recorded in a memory of the control unit (not shown). It should further be appreciated that selected steps may be repeated as necessary to make further measurements.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An apparatus for inspecting welds in a nuclear reactor, comprising:
   a body;
   a rotatable pad on the body;
   a first horizontal pad and a second horizontal pad on opposing sides of the body;
   a first shaft and a second shaft connected to the body, the first and the second horizontal pads being slideably mounted on the first shaft and the second shaft, respectively, to configure the body to move in a vertical direction;
   a first vertical pad and a second vertical pad on opposing sides of the body;
   a third shaft and a fourth shaft connected to the body, the first vertical pad and the second vertical pad being slideably mounted on the third shaft and the fourth shaft, respectively, to configure the body to move in a horizontal direction; and
   an inspection device.

2. The apparatus of claim 1, wherein the rotatable pad is located at a central portion of the body to rotate the inspection device.

3. The apparatus of claim 2, wherein a rotation of the rotatable pad is in increments of 90 degrees.

4. The apparatus of claim 1, further comprising:
   legs, each of the legs being attached to a respective side of the body, each of the first shaft, the second shaft, the third shaft and the fourth shaft being held by a respective one of the legs.

5. The apparatus of claim 4, wherein each of the legs is attached to the body by a stem member.

6. The apparatus of claim 4, wherein each of the legs is substantially Y-shaped or U-shaped.

7. The apparatus of claim 1, further comprising:
   a forked arm on each side of the body, wherein each of the first horizontal pad and the second horizontal pad, and the first vertical pad and the second vertical pad, being mounted on one of the respective forked arms.

8. The apparatus of claim 7, wherein each of the forked arms is substantially Y-shaped or U-shaped.

9. The apparatus of claim 7, further comprising:
a support member attached to each of the forked arms,
wherein each of the support members includes a hole for inserting one of the first shaft, the second shaft, the third shaft and the fourth shaft, respectively, each of the respective support members being configured to slideably move the first horizontal pad, the second horizontal pad, the first vertical pad and the second vertical pad, respectively, along the first shaft, the second shaft, the third shaft and the fourth shaft, to move the body in the respective horizontal or vertical directions.

10. The apparatus of claim 9, wherein each of the first horizontal pad, the second horizontal pad, the first vertical pad and the second vertical pad each respectively slide in an axial direction along the first shaft, the second shaft, the third shaft and the fourth shaft.

11. The apparatus of claim 9, wherein the first shaft, the second shaft, the third shaft and the fourth shaft each are a ball screws that translate rotational motion to linear motion to configure the body to move in the respective horizontal or vertical direction.

12. The apparatus of claim 4, wherein the inspection device is mounted to one of the legs.

13. The apparatus of claim 12, wherein the inspection device is an ultrasonic probe.

14. The apparatus of claim 13, wherein the ultrasonic probe is attached to a gimbal sensor.

15. The apparatus of claim 12, wherein the inspection device is supported by support arms.

16. The apparatus of claim 1, further comprising:
a vacuum system to controllably adhere or force the first horizontal pad, the second horizontal pad, the first vertical pad and the second vertical pad to a surface of a core shroud.

17. The apparatus of claim 1, wherein the first shaft and the second shaft are about parallel to each other, and the third shaft and the fourth shaft are about parallel to each other.

18. The apparatus of claim 16, wherein the vacuum system includes,
a venturi valve,
a hose connected to the venturi valve, and
a pump in fluid communication with the hose and the venturi valve, the pump and the venturi valve being configured to create a vacuum force to adhere the first horizontal pad, the second horizontal pad, the first vertical pad and the second vertical pad to the surface of the core shroud.

* * * * *